United States Patent Office

2,890,960
Patented June 16, 1959

2,890,960

METHOD FOR FRUIT FLY CONTROL

Vladimir Dvorkovitz, Elmhurst, and Ivan C. Brooks, Bellwood, Ill., assignors to The Diversey Corporation, a corporation of Illinois No Drawing. Application February 7, 1955
Serial No. 486,679

8 Claims. (Cl. 99—154)

This invention relates to the protection of foodstuffs against fruit flies. More particularly, this invention is concerned with novel compositions and methods of preventing ovideposition of fruit flies on foodstuffs such as fruits and vegetables.

It has been found that washing of foodstuffs prior to processing does not always place them in condition for consumption. Thus, when tomatoes are in the field, fruit flies lay their eggs buried in the flesh of the tomato, ordinarily where cracks are present. When so buried, the eggs often go undetected and unremoved by ordinary washing techniques. Therefore, a series of tests was performed to determine the ovideposition habits of fruit flies in an effort to eliminate this method of food contamination. Test fruit flies were placed in a large glass jar which contained whole ripe tomatoes free of blemishes and cracks. In 24 hours, all of the fruit flies were dead without laying eggs. Consequently, it was found that adult fruit flies can survive for only a short time without food.

The previous test was repeated except that food was supplied for the flies in the form of sugar-water. This test was conducted for 7 days at the end of which time the flies were alive but no eggs had been laid. This indicated that fruit flies need some sort of fermenting or yeast containing material to stimulate egg laying.

With this in mind, a third test was conducted. In this test ripe tomatoes with cracks and blemishes were placed in a large glass jar along with undamaged tomatoes and flies introduced into the jar. After 24 hours, many eggs had been laid in the cracks and blemishes of the damaged tomatoes with only an occasional egg scattered on the undamaged tomatoes. The eggs laid in the cracks and blemishes of the undamaged tomatoes were for the most part inserted or buried in the open flesh of the tomatoes. Only a small percent of eggs were laid on the surface of the tomatoes. Those eggs on the surface were easily removed by immersing the tomatoes in water and slightly agitating the contents. It was impossible to remove those eggs that were buried by a washing process. The only feasible method of removing the buried eggs was to cut out those areas where cracks or broken skin appeared on the tomatoes.

An additional test was conducted to determine whether fruit flies would ovideposit in cooked tomatoes which had been treated with a preservative to keep them from fermenting. The preservative used in this test was sodium benzoate. Small containers of cooked tomatoes with the preservative were placed in glass jars along with fruit flies. The flies laid eggs in the cooked tomatoes and the eggs hatched; but, in all cases, the maggots failed to survive. This indicates that the maggots must have fermenting fruit or fruits containing yeast to survive and reach the adult stage.

It has been discovered according to the present invention that the laying of eggs by fruit flies on comestible products, particularly fruit and vegetables, can be greatly restricted and prevented by the use of antienzymes.

The prevention of egg laying by fruit flies is achieved by applying novel compositions to the food to be protected. These novel compositions comprise an antienzyme and an inert carrier. Such compositions are conveniently produced by intimately mixing the carrier and antienzyme according to usual techniques.

These novel compositions preferably also contain a nonionic surface active agent. The addition of a surface active agent greatly enhances the effect of, or even synergises with, the antienzyme in preventing ovideposition. The surface active agents alone are not effectively active in preventing ovideposition. If desired, the antienzyme and surface active agent may be combined and marketed as such or, if desired, with a minimum amount of carrier. In this way shipping costs are kept low. When it is desired to apply the composition, additional quantities of carrier may be added until the antienzyme is adjusted to the desired concentration.

Essentially, any antienzymes may be used for this purpose and in these compositions provided, of course, the antienzyme has the capacity to reduce egg laying by fruit flies; it must be stated, however, that it seems all antienzymes have this capacity. Examples of antienzymes which may be used in the preparation of these novel compositions are dehydroacetic acid, 2-methyl-1,4-naphthoquinone, p-hydroxybenzoic acid, n-lauroyl sarcosinic acid and salts and active derivatives therefor. Other enzyme inhibitors which may be used are disclosed in Jour. Dental Research, 32, 486–496 (1953). The amount of antienzyme needed to retard ovideposition will vary with the antienzyme used. However, concentrations of about 0.05% to 10% based on the weight of composition as applied are usually adequate.

Any suitable carrier, whether liquid or solid, may be used in preparing these compositions. Water is the preferred liquid carrier although organic solvents which have no harmful effects to the food stuffs, particularly fruits and vegetables, may be used. Solid carriers such as clays may be used.

Examples of surface active agents which may be used in these compositions are alkyl aryl polyether alcohol sold as Triton X–100, salts of dodecyl benzene sulfonic acid, the sodium salt of which is sold as Oronite, and polyoxyethylene sorbitan mono-oleate sold as Tween-80. From 0.05% to about 0.5% of such wetting agents based on the final concentration of compositions as applied to the foodstuffs is considered adequate for most purposes. However, larger and smaller amounts may be used if advisable. More than one surface active agent may be used at any one time.

The compositions may be sprayed, dusted, or applied to fruits and vegetables by any of the conventional methods. The preferred method, however is to employ an aqueous solution and spray the fruits or vegetables. Applications should be made as frequently as is required to have a sufficient amount of antienzyme present to prevent ovideposition. In field use daily (24 hour) applications may be made, particularly on sensitive fruits and vegetables such as tomatoes.

The following specific examples illustrate the practice of the invention but are not to be contrued as limiting the invention either to the compositions or methods of preventing fruit fly ovideposition as shown therein.

EXAMPLE 1

Into a test cage suitable for holding fruit flies was placed a ripe tomato cut in half. One half of the tomato was treated with sodium dehydroacetate and the other half was left untreated. Water was the carrier and the solution was applied by spraying. Into each cage was placed 400–500 fruit flies. No surface active agent was employed with the antienzyme although the activity of Triton X–100 alone was determined. The number of eggs on each piece of tomato was counted with the results shown in Table 1.

Table 1

| Material | Conc., percent | No. of Eggs. In 24 Hrs. Without Wetting Agent | | No. of Eggs In 48 Hrs. Without Wetting Agent | |
|---|---|---|---|---|---|
| | | Treated | Control | Treated | Control |
| Triton X–100 | 10 | 67 | 250 | 263 | [1] TNTC |
| Sodium Dehydroacetate | 1 | 100 | 350 | 300 | TNTC |
| Do | 10 | 0 | 400 | 111 | TNTC |

[1] TNTC—Too numerous to count.

EXAMPLE 2

The procedure of Example 1 was followed and sodium dehydroacetate was tested with and without the use of the wetting agent Triton X–100. The results are shown in Table 2.

Table 2

| Material | Conc., percent | No. of Eggs in 24 Hrs. | | | | No. of Eggs in 48 Hrs. | | | |
|---|---|---|---|---|---|---|---|---|---|
| | | Without Wetting agent | | With 1% Triton | | Without Wetting agent | | With 1% Triton | |
| | | Treated | Control | Treated | Control | Treated | Control | Treated | Control |
| Sodium Dehydroacetate | 10 | 3 | 172 | 6 | 450 | 8 | 200 | 10 | 510 |
| Do | 1 | 170 | 170 | 75 | 750 | 200 | 430 | 270 | [1] TNTC |

[1] TNTC—Too numerous to count.

EXAMPLE 3

The procedure of Example 1 was followed to test the activity of three other antienzymes in retarding or preventing oviposition. Triton X–100 was used in 1% concentration and water was the carrier. The results obtained are set forth in Table 3.

Table 3

| Material | Conc., percent | No. of Eggs In 24 Hrs. | | No. of Eggs In 48 Hrs. | |
|---|---|---|---|---|---|
| | | Treated | Control | Treated | Control |
| 2-Methyl-1,4-naphthoquinone | 5 | 1 | 200 | 1 | 200 |
| Do | 1 | 112 | 540 | 230 | 650 |
| p-Hydroxybenzoate | 10 | 75 | 80 | 90 | 120 |
| Sodium n-lauroyl sarcosinate | 10 | 82 | 170 | 115 | 200 |

Various changes and modifications of the invention can be made and, to the extent that such variations incorporate the spirit of this invention, they are intended to be included within the scope of the appended claims.

What is claimed is:

1. The method of preventing oviposition by fruit flies on fruit and vegetables which comprises supplying on the unpeeled surface thereof an effective amount of an antienzyme oviposition inhibitor of the group consisting of dehydroacetic acid, 2-methyl-1,4-naphthoquinone, n-lauroyl sarscosinic acid, p-hydroxybenzoic acid and salts of said acids, and maintaining the antienzyme thereon during exposure to fruit flies.

2. The method of claim 1 in which the antienzyme is supplied to the unpeeled surface in a composition comprising the antienzyme, a carrier and a nonionic surface active agent.

3. The method of preventing oviposition by fruit flies on fruits and vegetables which comprises supplying on the unpeeled surface thereof an effective amount of a composition comprising sodium dehydroacetate, an alkyl aryl polyether alcohol and water, and maintaining the antienzyme thereon during exposure to fruit flies.

4. The method of preventing oviposition by fruit flies on fruits and vegetables which comprises supplying on the unpeeled surface thereof an effective amount of a composition comprising 2-methyl-1,4-naphthoquinone, an alkyl aryl polyether alcohol, and water, and maintaining the antienzyme thereon during exposure to fruit flies.

5. The method of preventing oviposition by fruit flies on fruits and vegetables which comprises supplying on the unpeeled surface thereof an effective amount of a composition comprising sodium n-lauroyl sarcosinate, an alkyl aryl polyether alcohol, and water, and maintaining the antienzyme thereon during exposure to fruit flies.

6. The method of preventing oviposition by fruit flies on fruits and vegetables which comprises supplying on the unpeeled surface thereof an effective amount of a composition comprising sodium dehydroacetate and water, and maintaining the antienzyme thereon during exposure to fruit flies.

7. The method of preventing oviposition by fruit flies on fruits and vegetables which comprises supplying on the unpeeled surface thereof an effective amount of a composition comprising 2-methyl-1,4-naphthoquinone, and water, and maintaining the antienzyme thereon during exposure to fruit flies.

8. The method of preventing oviposition by fruit flies on fruits and vegetables which comprises supplying on the unpeeled surface thereof an effective amount of a composition comprising sodium n-lauroyl sarcosinate, and water, and maintaining the antienzyme thereon during exposure to fruit flies.

References Cited in the file of this patent

UNITED STATES PATENTS

| Re. 20,490 | McLean | Aug. 31, 1937 |
| 2,030,093 | Bousquet et al. | Feb. 11, 1936 |
| 2,045,680 | Wayland | June 30, 1936 |
| 2,474,228 | Coleman et al. | June 28, 1949 |
| 2,539,470 | Pryor | Jan. 30, 1951 |
| 2,678,277 | Glabe | May 11, 1954 |
| 2,689,170 | King | Sept. 14, 1954 |
| 2,703,288 | Worson | Mar. 1, 1955 |

OTHER REFERENCES

"Chemistry and Methods of Enzymes," Sumner et al., third edition, Academic Press Inc., New York, 1953, page 451.

Journal of Dental Research, vol. 32, No. 4, August 1953, pages 486–496.